United States Patent
Poulson et al.

(10) Patent No.: US 12,422,077 B2
(45) Date of Patent: Sep. 23, 2025

(54) SLIDABLE GLADHAND

(71) Applicant: Autonomous Solutions, Inc., Mendon, UT (US)

(72) Inventors: Eric Poulson, Mendon, UT (US); Mike McNees, Mendon, UT (US); Robert Ashby, Mendon, UT (US); Mitch Torrie, Mendon, UT (US)

(73) Assignee: Autonomous Solutions, Inc., Mendon, UT (US)

( * ) Notice: Subject to any disclaimer, the term of this patent is extended or adjusted under 35 U.S.C. 154(b) by 526 days.

(21) Appl. No.: 17/888,233

(22) Filed: Aug. 15, 2022

(65) Prior Publication Data
US 2023/0046740 A1     Feb. 16, 2023

Related U.S. Application Data

(60) Provisional application No. 63/233,074, filed on Aug. 13, 2021.

(51) Int. Cl.
    *B60T 17/04*     (2006.01)
    *F16L 37/256*     (2006.01)

(52) U.S. Cl.
    CPC ........... *F16L 37/256* (2013.01); *B60T 17/043* (2013.01)

(58) Field of Classification Search
CPC ....... B60T 17/043; F16L 37/256; F16L 37/40; F16L 37/44
See application file for complete search history.

(56) References Cited

U.S. PATENT DOCUMENTS

| | | | |
|---|---|---|---|
| 3,554,230 A * | 1/1971 | Berg | F16L 37/46 137/614.04 |
| 4,544,132 A | 10/1985 | Allen et al. | |
| 5,683,148 A * | 11/1997 | Li | B60T 17/043 303/7 |
| 10,611,355 B2 * | 4/2020 | Sonar | B60T 17/043 |
| 10,926,752 B2 * | 2/2021 | Papafagos | B01D 39/12 |
| 11,865,883 B2 * | 1/2024 | Winograd | B60D 1/62 |
| 2006/0071447 A1 | 4/2006 | Gehring et al. | |
| 2009/0184490 A1 | 7/2009 | Alguera | |

(Continued)

FOREIGN PATENT DOCUMENTS

DE     102017109731 A1     11/2018

OTHER PUBLICATIONS

International Search Report and Written Opinion in PCT Application No. PCT/US2022/040347 mailed on Nov. 7, 2022, 9 pages.

(Continued)

*Primary Examiner* — Thomas W Irvin

(57) ABSTRACT

A gladhand is disclosed. The gladhand, for example, may include a gladhand body having a central axis and a substantially flat gladhand surface and a tongue that extends from the gladhand body and substantially perpendicular relative to the central axis. The gladhand, for example, may also include a concave pocket that extends from gladhand surface. The gladhand, for example, may also include a piston chamber within the gladhand body that extends substantially along the central axis and forming a piston aperture within the gladhand surface and a piston disposed within the piston chamber that actuates at least partially into and out of the piston chamber through the piston aperture along the central axis.

18 Claims, 16 Drawing Sheets

(56) References Cited

U.S. PATENT DOCUMENTS

| | | |
|---|---|---|
| 2018/0091717 A1 | 3/2018 | Ion |
| 2018/0188744 A1 | 7/2018 | Switkes et al. |
| 2018/0273034 A1 | 9/2018 | Gesch et al. |
| 2018/0326963 A1* | 11/2018 | Papafagos ............. B60T 17/043 |
| 2019/0031169 A1* | 1/2019 | Sonar ....................... B60D 1/64 |
| 2019/0064835 A1 | 2/2019 | Hoofard et al. |
| 2019/0302764 A1 | 10/2019 | Smith et al. |
| 2019/0367105 A1 | 12/2019 | Grossman |
| 2019/0382010 A1 | 12/2019 | Woodley et al. |
| 2020/0055357 A1 | 2/2020 | Laine |
| 2020/0097021 A1 | 3/2020 | Carpenter et al. |
| 2020/0189591 A1 | 6/2020 | Mellinger, III et al. |
| 2021/0053407 A1 | 2/2021 | Smith et al. |
| 2021/0185207 A1 | 6/2021 | Li et al. |

OTHER PUBLICATIONS

International Search Report and Written Opinion mailed dated Jul. 15, 2021, in PCT Application No. PCT/US2021/026735, 18 pages.

International Preliminary Report On Patentablility mailed dated Oct. 6, 2022, in PCT Application No. PCT/US2021/026735, 16 pages.

Restriction Requirement of U.S. Appl. No. 17/227,265, dated Jan. 19, 2023, 06 pages.

Non Final Office in U.S. Appl. No. 17/227,265, dated Mar. 1, 2023, 31 pages.

Final Office in U.S. Appl. No. 17/227,265, dated Apr. 5, 2023, 33 pages.

Non Final Office in U.S. Appl. No. 17/227,265, dated Jul. 19, 2024, 31 pages.

Extended European search report dated Feb. 9, 2024, in EP Application No. 21784432.3, 10 pages.

Final Office Action in U.S. Appl. No. 17/227,265, dated Aug. 15, 2024, 34 pages.

Notice of Allowance in U.S. Appl. No. 17/227,265, dated Dec. 10, 2024, 11 pages.

Office Action in EP Application No. 21784432.3, dated Dec. 12, 2024, 13 pages.

Extended European search report in EP Application No. 22856707.9, dated Feb. 18, 2025, 8 pages.

* cited by examiner

SLIDABLE GLADHAND

BACKGROUND

In normal operation, an autonomous vehicle may autonomously control its operation, for example, based on high level instructions. For instance, an autonomous vehicle may be capable of operating with limited or even no human direction beyond the high level instructions. As such, an autonomous vehicle may be utilized in a wide array of industrial operations such as those that are dangerous, dirty, and dull.

One such industrial operation is transportation of goods within a tractor-trailer. While autonomous driving operations for such tractors are improving, autonomously coupling a tractor with a trailer can be a challenge including connecting air hoses. Typical tractor-trailer links include two hose connections that communicate compressed air to the trailer. The connections are typically made through a gladhand. In some applications, only one gladhand is used. One gladhand connects pressurized air to the emergency brake. When this hose is pressurized, the emergency brake is disengaged, and the trailer is free to move. The other gladhand can connect pressurized air to the brakes. When this second hose is unpressurized, the brakes are disengaged, when this hose is pressurized, the brakes are engaged, and the trailer is slowed to a stop. Various other hoses, connections, gladhands, etc. may be made between a tractor and a trailer. One challenge with an autonomous tractor-trailer operations is the autonomous connecting and disconnecting of the gladhands and other connectors.

SUMMARY

A gladhand is disclosed. The gladhand, for example, may include a gladhand body having a central axis and a substantially flat gladhand surface and a tongue that extends from the gladhand body and substantially perpendicular relative to the central axis. The gladhand, for example, may also include a concave pocket that extends from gladhand surface. The gladhand, for example, may also include a piston chamber within the gladhand body that extends substantially along the central axis and forming a piston aperture within the gladhand surface and a piston disposed within the piston chamber that actuates at least partially into and out of the piston chamber through the piston aperture along the central axis.

The gladhand, for example, may include a seal disposed at least partially within the piston aperture and allows the piston to move into and out of the piston chamber.

The gladhand body, for example, may include a top surface, and wherein the top surface extends from the gladhand body across at least a portion of the tongue.

The concave pocket, for example, may be sized and configured to accept a tongue from a second gladhand.

The gladhand, for example, may include an air hose coupling. The gladhand may, for example, include an air channel or tube between the air hose coupling and the piston chamber.

For example, when air is passing through the air hose coupling a portion of the piston is actuated out of the piston chamber and when air is not passing through the air hose coupling the piston is disposed within the piston chamber.

The piston, for example, may include an air channel that allows air introduced from the air channel to pass through the air channel within the piston.

The gladhand may include an actuator coupled with the piston to move the piston in and out of the piston chamber.

The piston, for example, may not include an air channel within the piston. The piston, for example may include an air channel within the piston.

Another gladhand is disclosed that includes a gladhand body having a central axis and a substantially flat gladhand surface; a tongue that extends from the gladhand body and substantially perpendicular relative to the central axis; a piston chamber within the gladhand body that extends substantially along the central axis and forming a piston aperture within the gladhand surface; a piston disposed within the piston chamber that actuates at least partially into and out of the piston chamber through the piston aperture along the central axis; a supply air hose coupling coupled with the gladhand body; and a supply air channel disposed within the gladhand body that allows air to flow from the supply air channel to the piston chamber to actuate the piston in a first direction within the piston chamber.

The gladhand may include a control air hose coupling coupled with the gladhand body; and/or a control air channel disposed within the gladhand body that allows air to flow from the control air channel to the piston chamber to actuate the piston in second direction within the piston chamber, the second direction being opposite the first direction.

The gladhand may include a spring disposed within the piston that biases the piston relative to the gladhand body. The gladhand may include one or more seals disposed around the piston within the piston chamber. The gladhand may include a concave pocket that extends from gladhand surface.

The concave pocket, for example, may be sized and configured to accept a tongue from a second gladhand.

The gladhand may include a concave pocket that extends from gladhand surface.

The gladhand body, for example, may include a top surface, and wherein the top surface extends from the gladhand body across at least a portion of the tongue.

Another gladhand is disclosed that includes a gladhand body having a central axis and a substantially flat gladhand surface; a tongue that extends from the gladhand body and substantially perpendicular relative to the central axis; a piston chamber within the gladhand body that extends substantially along the central axis and forming a piston aperture within the gladhand surface; a piston disposed within the piston chamber that actuates at least partially into and out of the piston chamber through the piston aperture along the central axis; a supply air hose coupling coupled with the gladhand body; a supply air channel disposed within the gladhand body that allows air to flow from the supply air channel to the piston chamber to actuate the piston in a first direction within the piston chamber; a control air hose coupling coupled with the gladhand body; a control air channel disposed within the gladhand body that allows air to flow from the control air channel to the piston chamber to actuate the piston in second direction within the piston chamber, the second direction being opposite the first direction; and a spring disposed within the piston that biases the piston relative to the gladhand body.

DETAILED DESCRIPTION

A slidable gladhand is disclosed. Typical gladhands require a rotation to lock two gladhands together. Often a trailer may have a trailer gladhand and a tractor may have a truck gladhand. A connection can be made between the two gladhands by rotating the tractor gladhand onto the trailer gladhand whereby the two gladhands are coupled together via respective tongues rotating into respective concave pockets. Air from the tractor, for example, can be sent to the trailer via the connection between the two gladhands.

For example, a slidable gladhand can be coupled with a standard gladhand. For example, the trailer may include a standard gladhand. The tractor may include a slidable gladhand that couples with the standard gladhand by sliding the tractor gladhand to the trailer gladhand without rotating the tractor gladhand.

Figure 1:
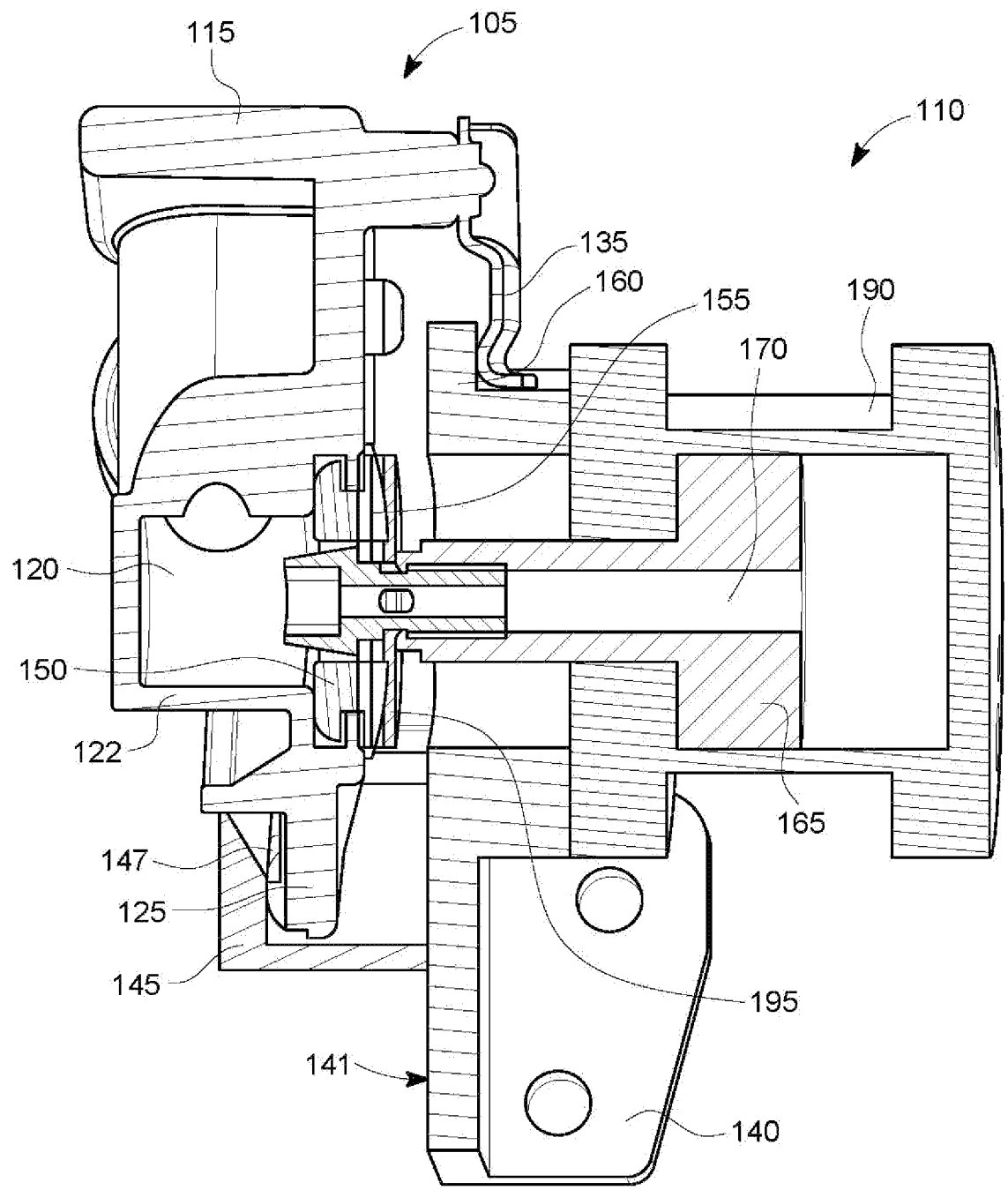
FIG. 1 is a side cutaway illustration of an example gladhand coupled with a tractor gladhand.
Figure 2:
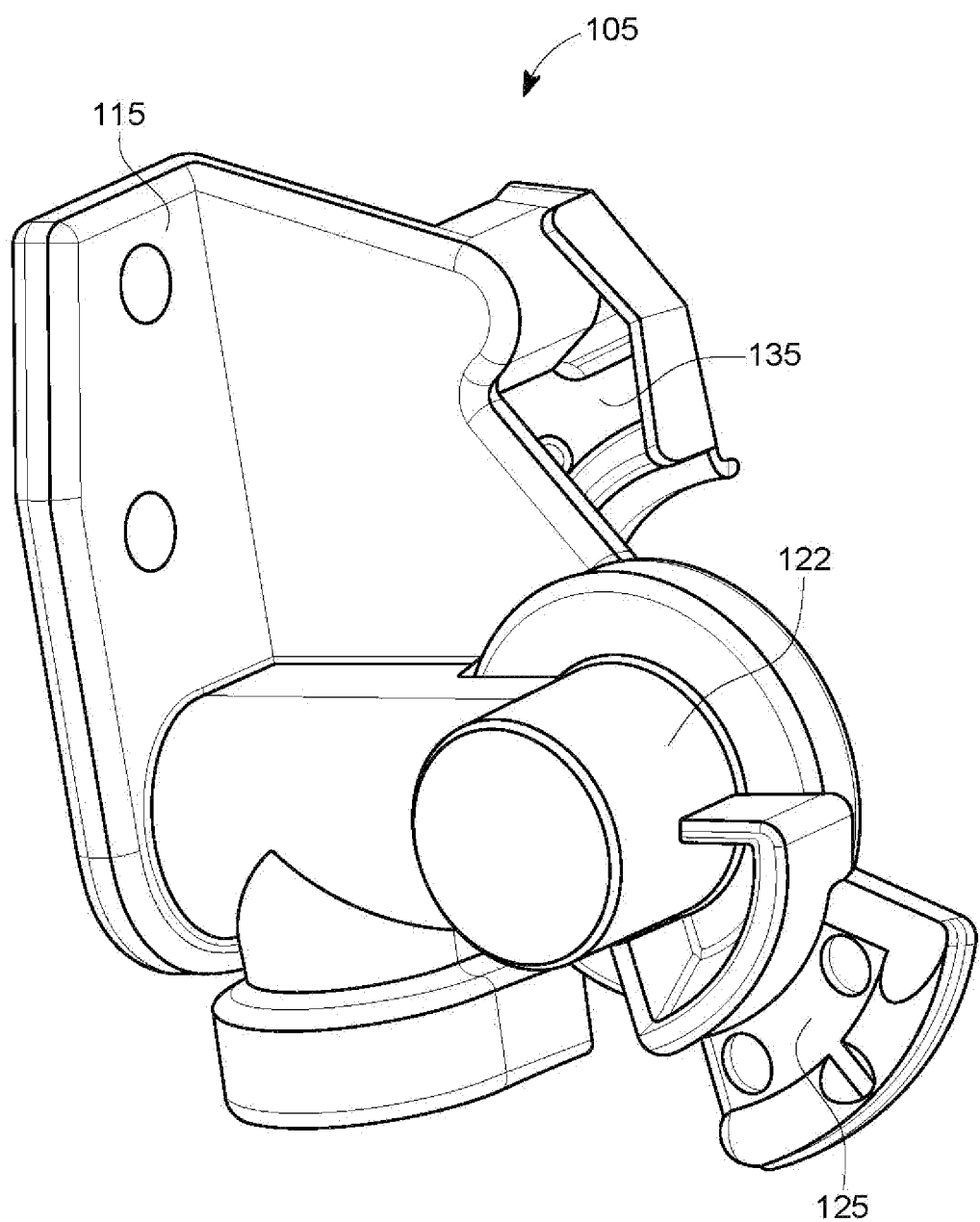
FIG. 2 is a perspective view of an example trailer gladhand.
Figure 3:
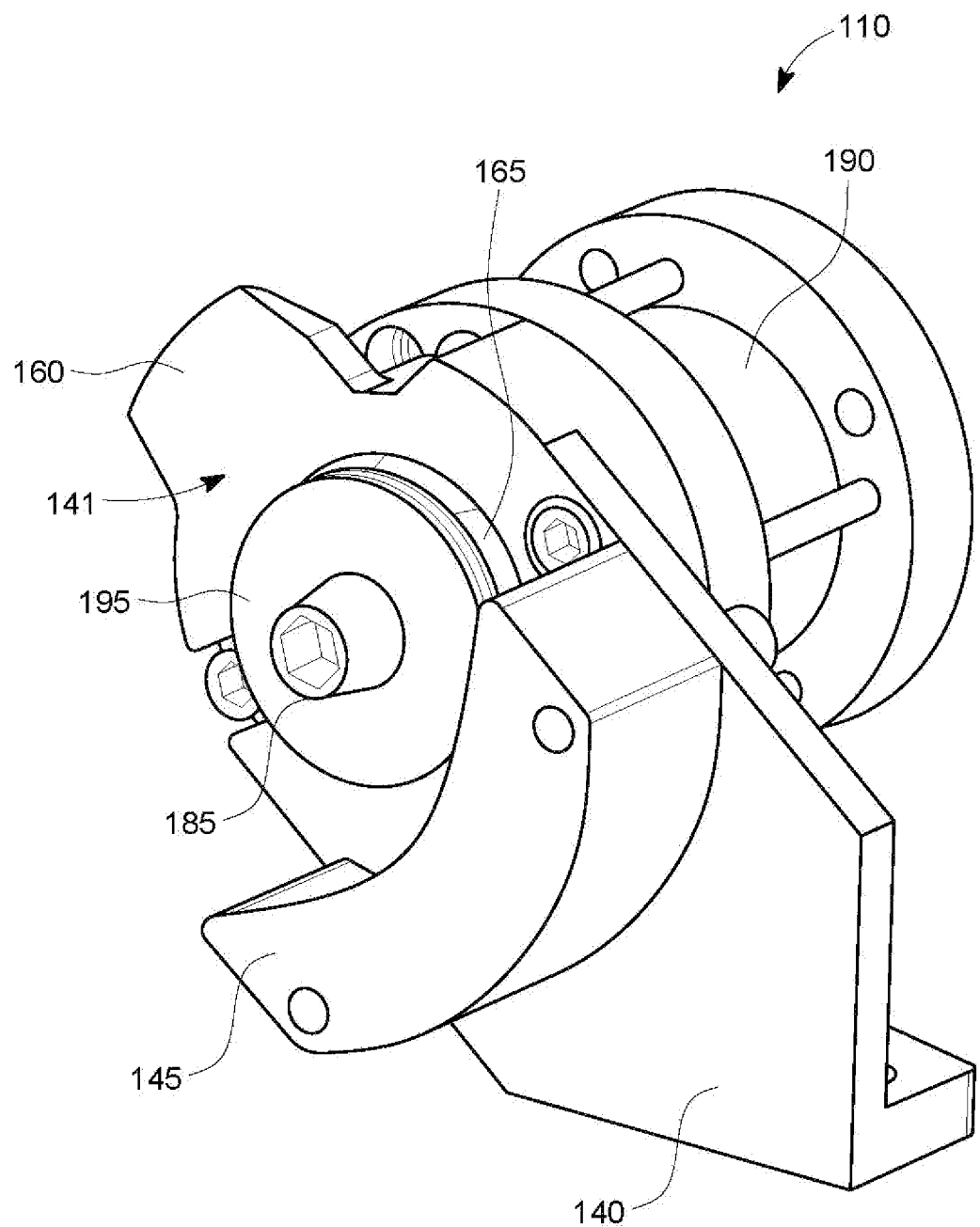
FIG. 3 is a perspective view of an example tractor gladhand.

FIG. 1 is a side cutaway illustration of a trailer gladhand 105 coupled with a tractor gladhand 110. To couple the two together, the tractor gladhand 110 slides into the trailer gladhand 105 to couple, rather than rotates to couple with the trailer gladhand 105. FIG. 2 is a perspective view of a trailer gladhand 105. FIG. 3 is a perspective view of a tractor gladhand 110.

The trailer gladhand 105, for example, may include a standard or typical gladhand. The trailer gladhand 105, for example, includes a gladhand body 115 with a cavity 120 defined by a cavity body 122. The cavity 120 may include an aperture that allows air to flow from the tractor gladhand 110 to the trailer gladhand 105. The aperture may be surrounded by trailer gladhand seal 150 that may be shaped like a donut having an inner aperture. The trailer gladhand 105 may also include a trailer pocket 135 and/or trailer tongue 125. The trailer pocket 135 may have a concave shape and/or may include a detent around an outer edge of a concave portion.

The tractor gladhand 110, for example, may include a gladhand body 140, a tractor tongue 160, a tractor pocket 145, and/or a gladhand surface 141. The tractor gladhand 110 may have a central axis 180. The gladhand surface 141 may extend along a plane substantially perpendicular from the central axis 180. When coupling or coupled together, the tractor tongue 160, for example, may extend from the gladhand body 140 such that the gladhand surface 141 may extend across the gladhand body 140 and the tractor tongue 160.

The tractor gladhand 110 may include a piston 165 disposed within a piston cylinder 190. Both the piston 165 and the piston cylinder 190 may be aligned substantially along the central axis 180. An end of the piston cylinder 190 may extend to the gladhand surface 141 where a piston aperture within the gladhand surface 141 may allow the piston 165 (and/or the plunger 185) to actuate into and out of the piston cylinder 190. The piston aperture may be surrounded by a tractor gladhand seal 155.

The piston cylinder 190, for example, may be coupled with an air hose coupling 175. The air hose coupling 175 may connect to a supply of compressed air on the tractor. An air channel within the gladhand body 140 may allow for air to flow from the air hose coupling 175 to the piston cylinder 190. When connected with compressed air, the compressed air may actuate the piston 165 so the end of the piston 165 (e.g., including the plunger 185) may extend out of the aperture within the gladhand surface 141.

The pressure of the piston 165 against the trailer gladhand 105, for example, may push the trailer tongue 125 against the top interior surface of the tractor pocket 145 and/or may push the top interior surface of the trailer pocket 135 against the tractor tongue 160. The friction between the trailer tongue 125 and the tractor pocket 145, the friction between the trailer pocket 135 and the tractor tongue 160, and/or the insertion of the piston 165 into the trailer gladhand 105, for example, may keep the trailer gladhand 105 and the tractor gladhand 110 coupled together.

The piston 165, for example, may include an air channel 170 that extends through the piston 165 and allows compressed air to flow from the piston cylinder 190 through the piston 165 into the trailer gladhand 105. When compressed air is coupled with the tractor gladhand 110 the piston 165 engages with the trailer gladhand 105 and compressed air flows into the trailer gladhand 105. For example, this may be useful for a gladhand connection for trailer parking brakes that are only released under pressure from compressed air and/or for brakes that are engaged under pressure from compressed air.

The piston 165, for example, may or may not include the air channel 170. For example, without the air channel 170, when compressed air is coupled with the tractor gladhand 110 the piston 165 engages with the trailer gladhand 105 but no compressed air flows into the trailer gladhand 105. For example, this may be useful for a gladhand connection for trailer brakes (not parking brakes) that are engaged under pressure from compressed air. This would allow the gladhand to remain coupled without engaging the brakes.

As another example, with the air channel 170, when compressed air is coupled with the tractor gladhand 110 the piston 165 may engage with the trailer gladhand 105 and allow compressed air flow into the trailer gladhand 105. For example, this may be useful for a gladhand connection for parking brakes (not trailer brakes) that are engaged under pressure from compressed air. This would allow the gladhand to remain coupled and disengage the parking brakes with compressed air.

The seal plate 195 may create a seal between the piston 165 and inner surface of the piston cylinder 190 when the piston 165 is actuated.

FIG. 1 shows the piston 165 actuated through the piston aperture in the gladhand surface 141 along the central axis and into the cavity 120 of the trailer gladhand 105 through the trailer gladhand seal 150. FIG. 1 also shows the tractor tongue 160 disposed beneath the trailer pocket 135 and/or the trailer tongue 125 disposed beneath the tractor pocket 145.

As shown in FIG. 3, the piston 165 may include a plunger 185 that extends from the surface of the piston 165. The plunger 185 may have a conic shape with a flat top such as, for example, the end of the plunger may be angled from the body of the plunger 185 toward the end of the plunger with a flat surface.

Figure 4:
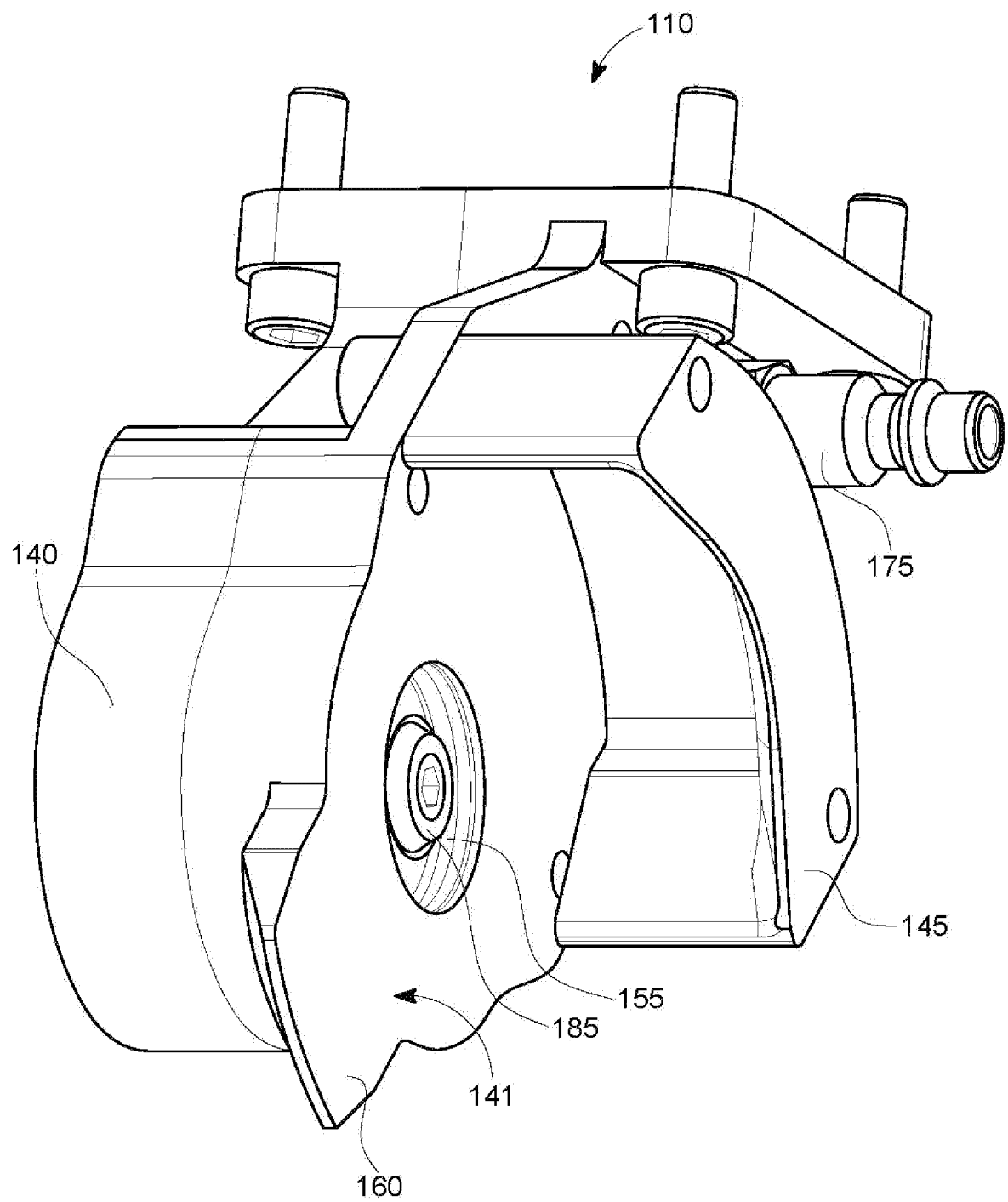
FIG. 4 is a perspective view of a tractor gladhand with the piston unactuated.

FIG. 4 is a perspective view of a tractor gladhand 110 with the piston 165 unactuated.

Figure 5:
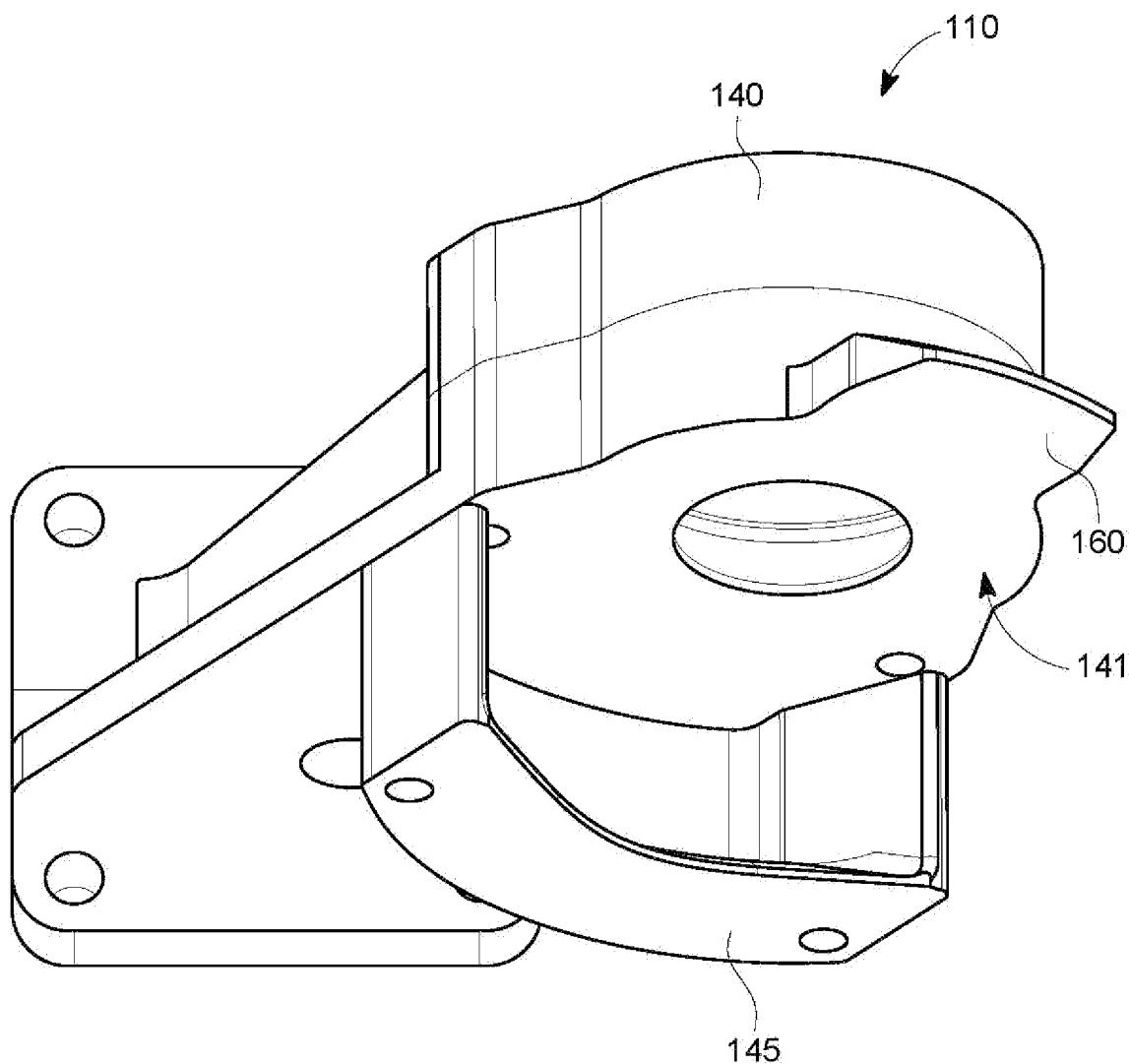
FIG. 5 is a perspective view of a tractor gladhand with the piston actuated out of the piston cylinder.

FIG. 5 is another perspective view of a tractor gladhand 110 with the piston 165 removed from the piston cylinder 190.

Figure 6:
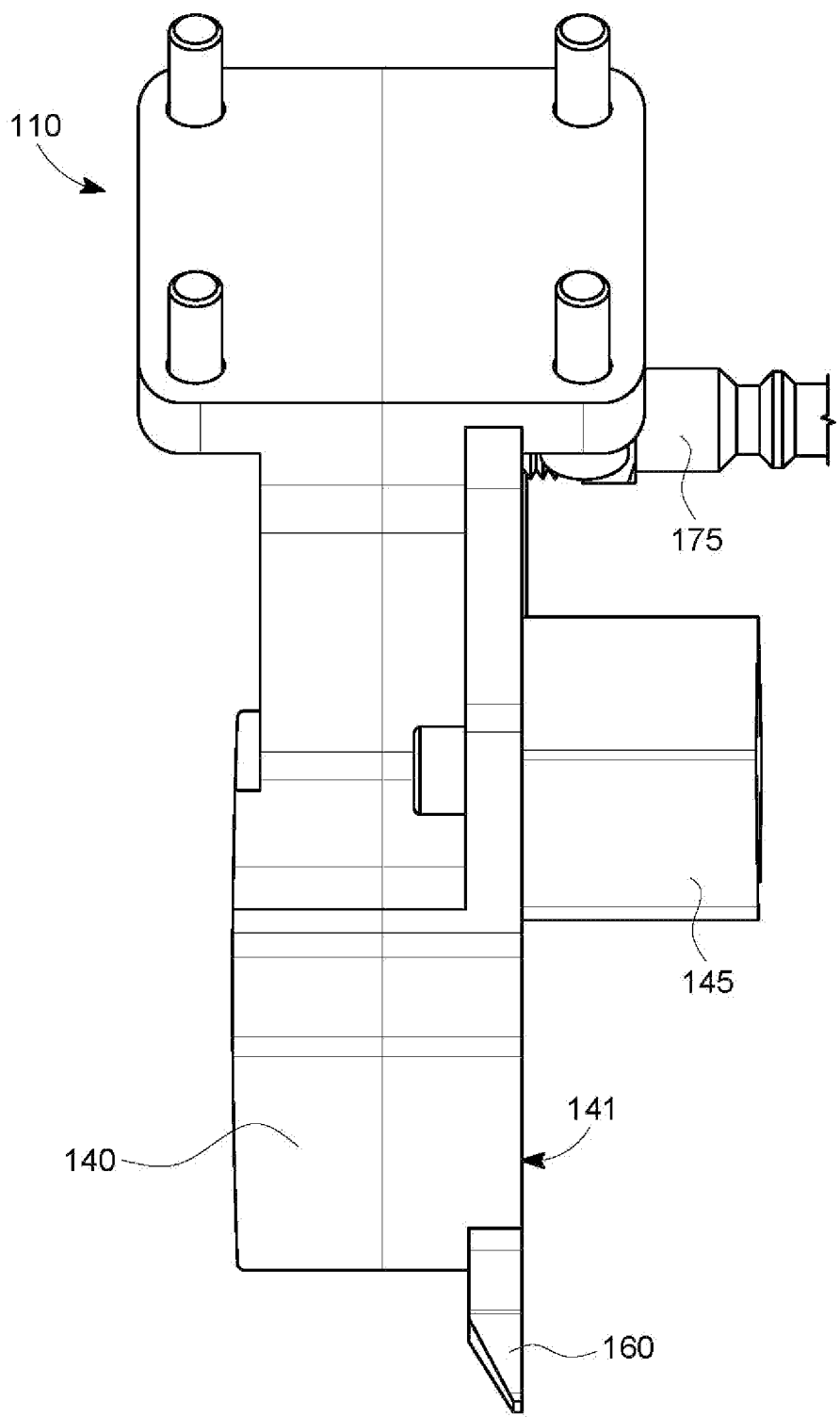
FIG. 6 is a side view of a tractor gladhand with the piston unactuated.

FIG. 6 is a side view of a tractor gladhand 110 with the piston unactuated.

Figure 7:
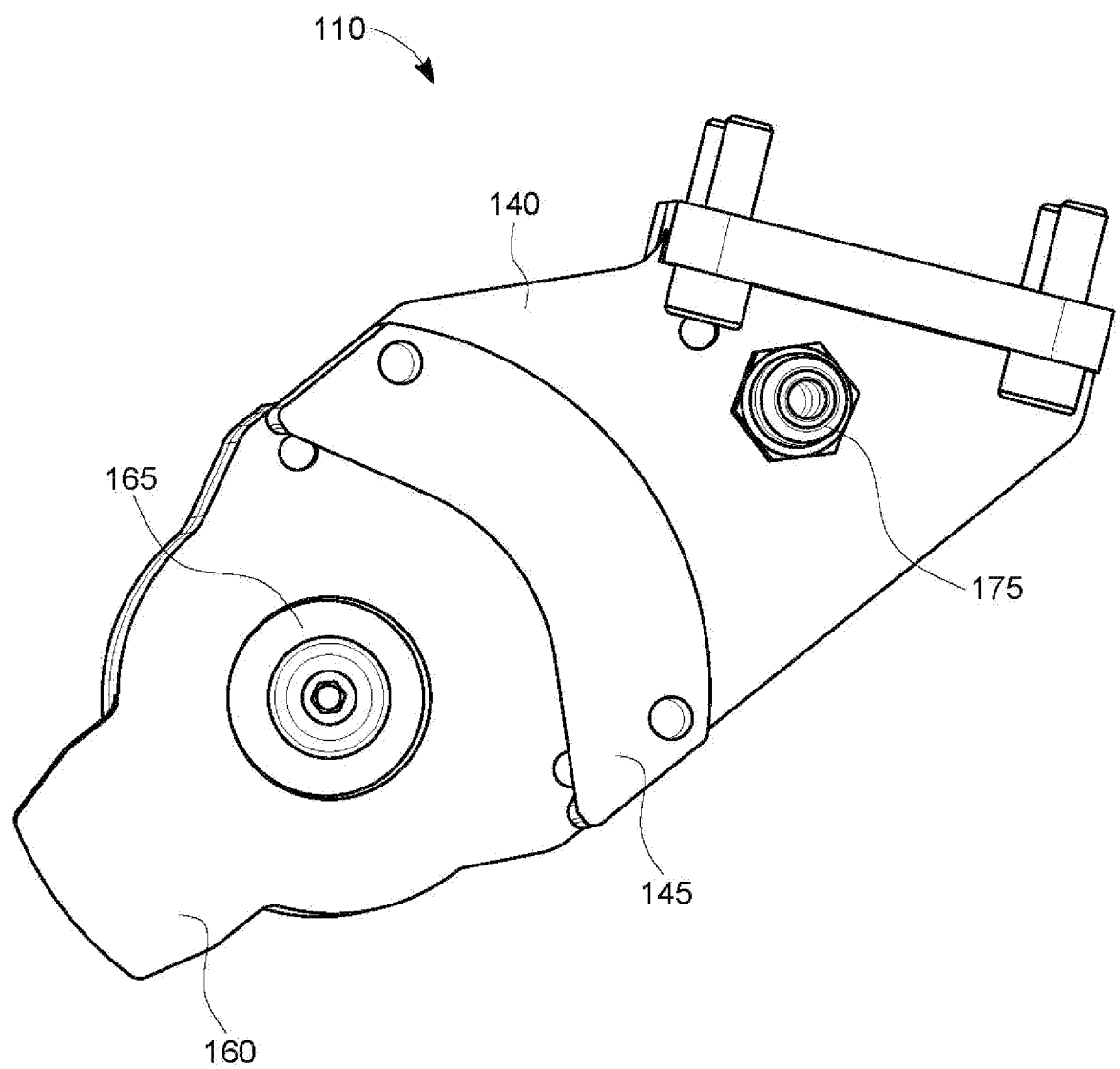
FIG. 7 is a top view of a tractor gladhand with the piston unactuated.

FIG. 7 is a top view of a tractor gladhand 110 with the piston unactuated.

Figure 8:
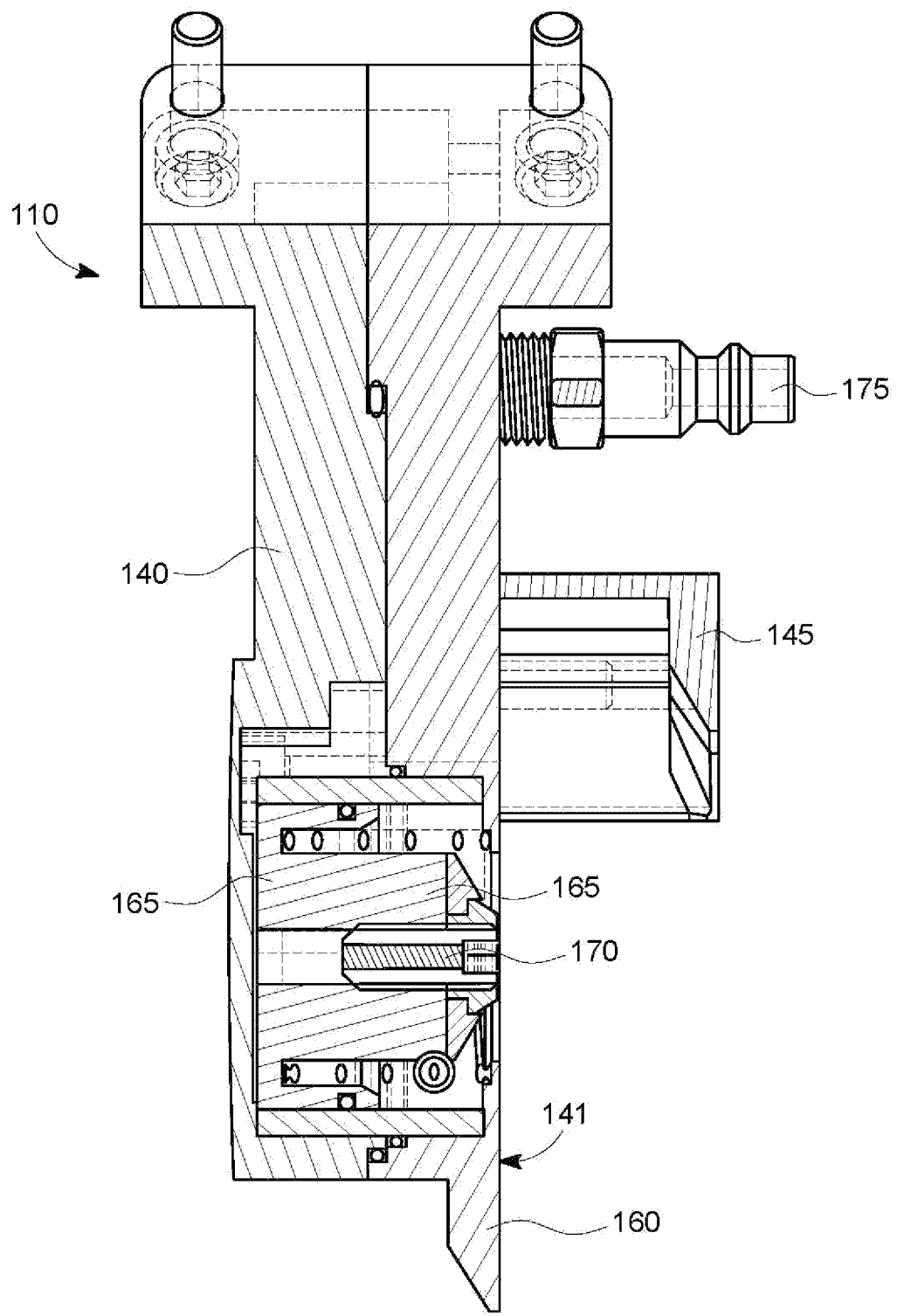
FIG. 8 is a cutaway side view of a tractor gladhand with the piston unactuated.

FIG. 8 is a cutaway side view of a tractor gladhand 110 with the piston unactuated.

Figure 9:
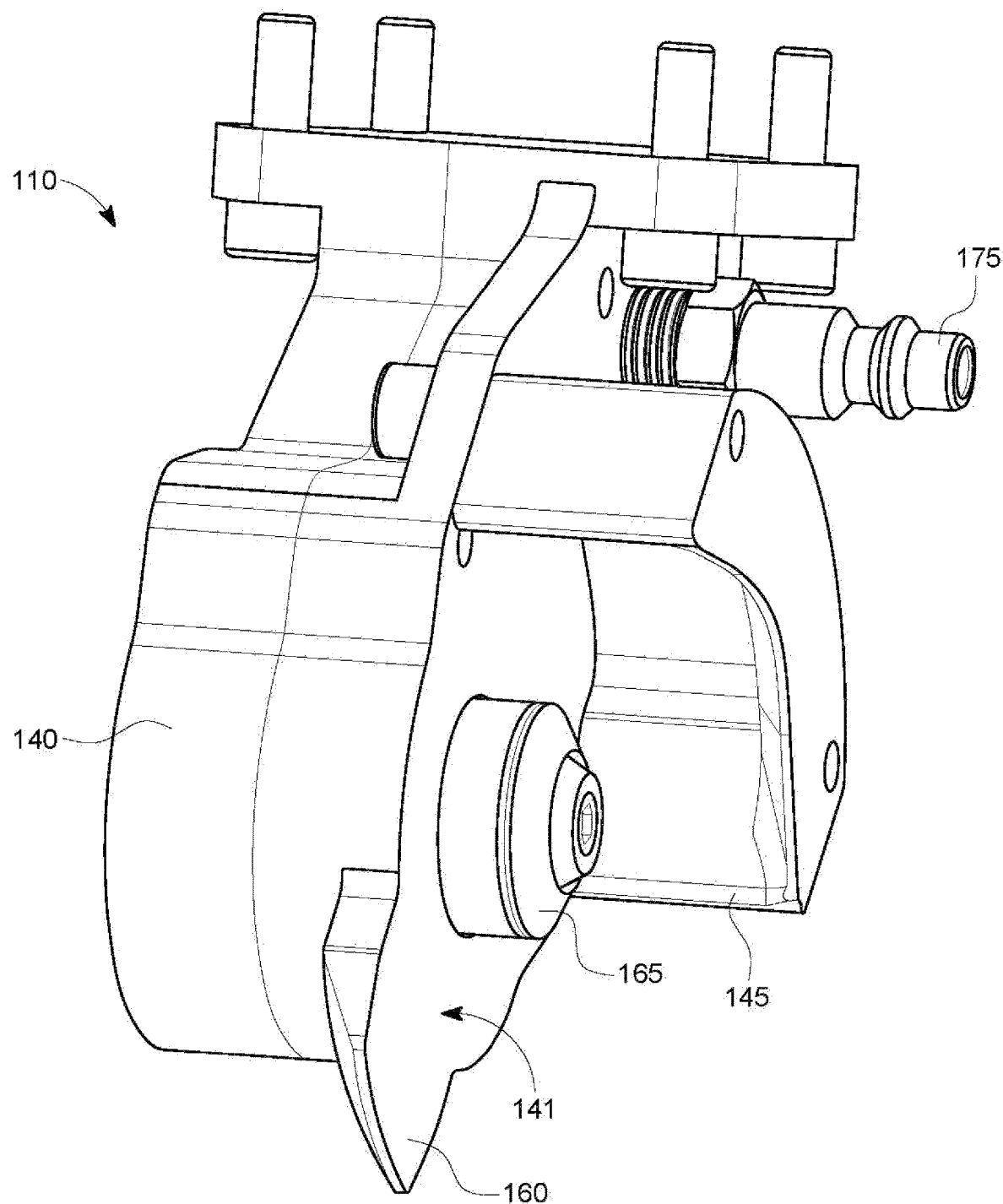
FIG. 9 is a perspective view of a tractor gladhand with the piston actuated.

FIG. 9 is a perspective view of a tractor gladhand 110 with the piston actuated.

Figure 10:
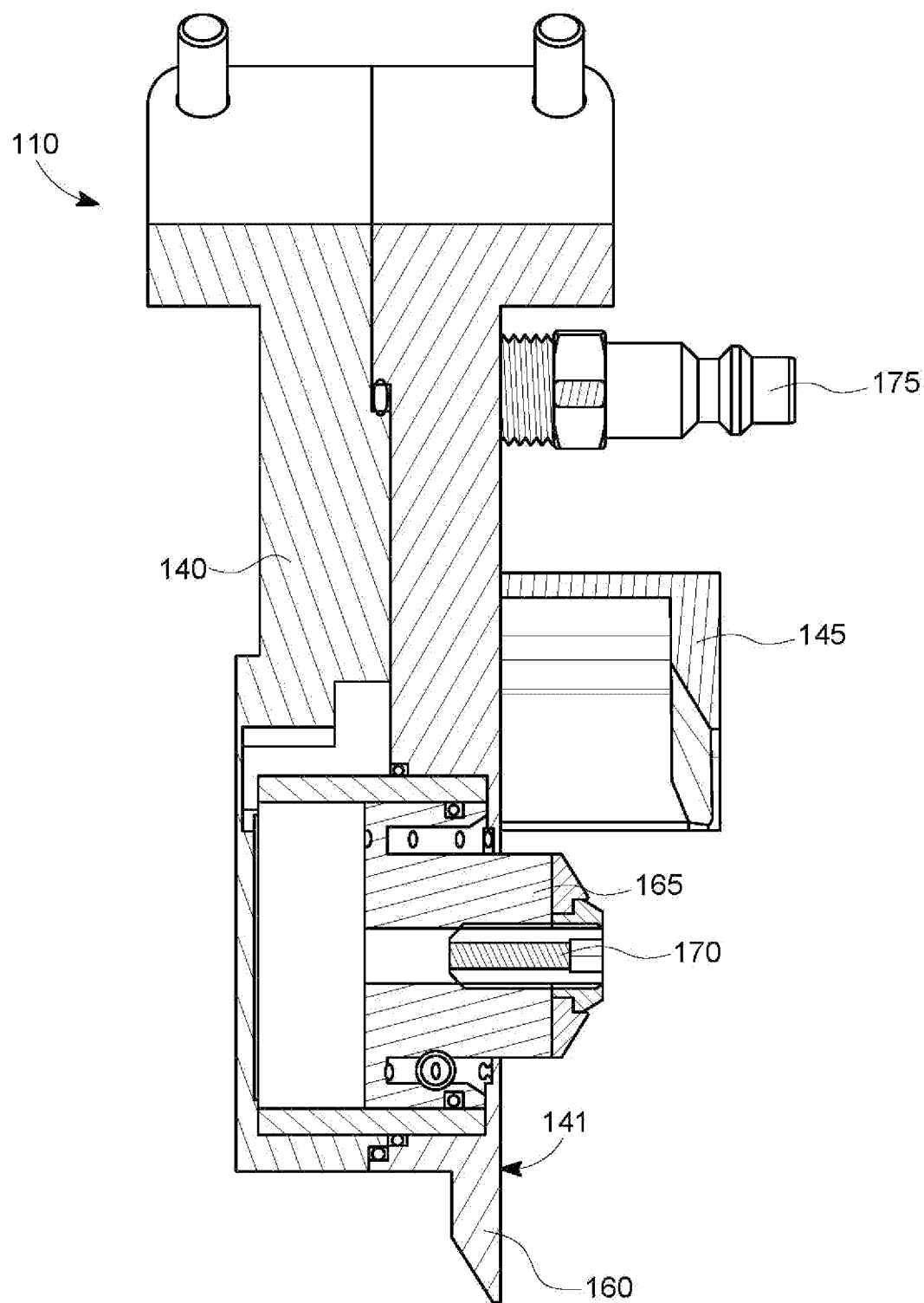
FIG. 10 is a cutaway side view of a tractor gladhand with the piston actuated.

FIG. 10 is a cutaway side view of a tractor gladhand 110 with the piston actuated.

Figure 11:
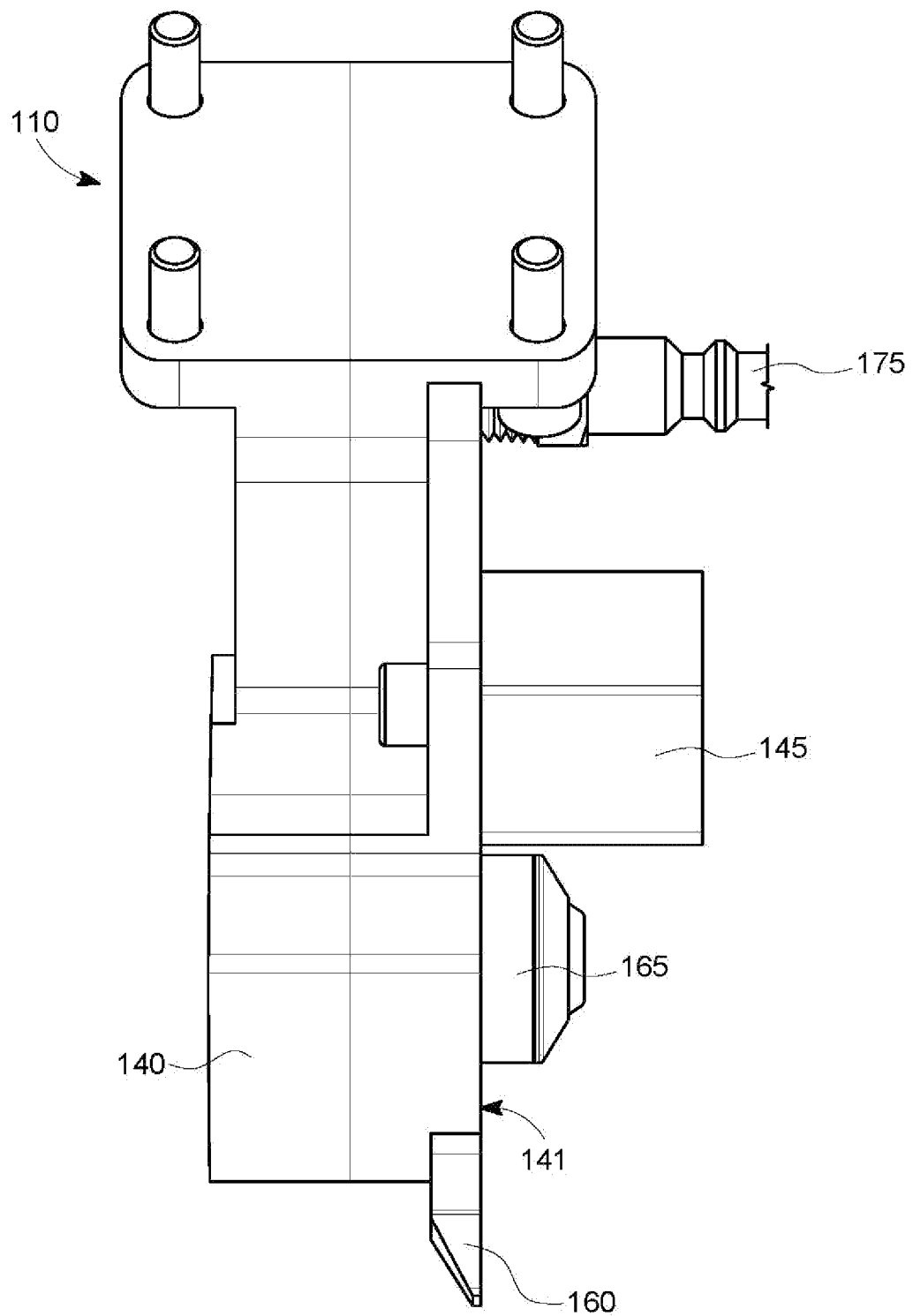
FIG. 11 is a side view of a tractor gladhand with the piston actuated.

FIG. 11 is a side view of a tractor gladhand 110 with the piston actuated.

Figure 12:
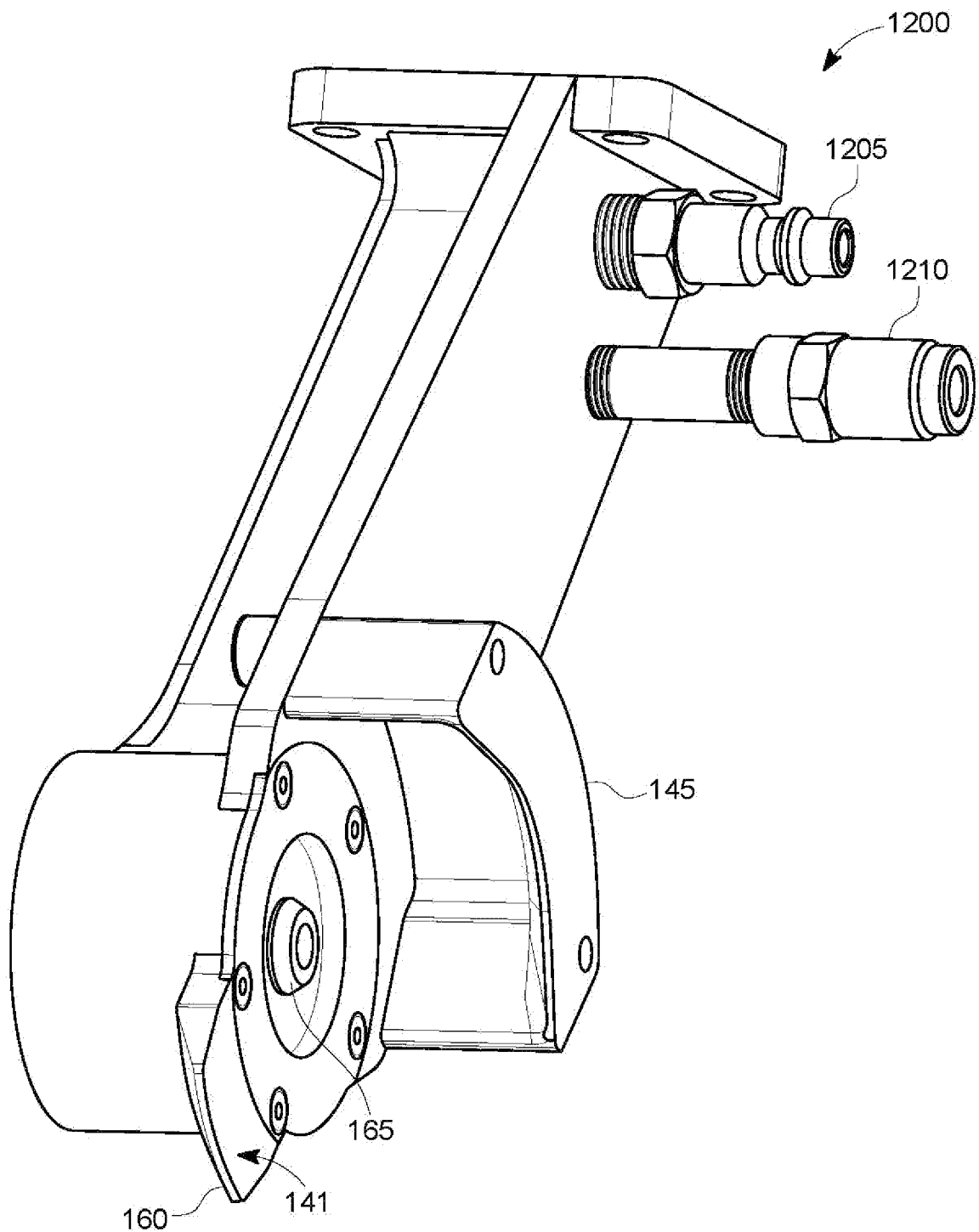
FIG. 12 is a perspective view of a tractor gladhand with the piston unactuated.

FIG. 12 is a perspective view of a tractor gladhand 110 with the piston unactuated.

Figure 13:
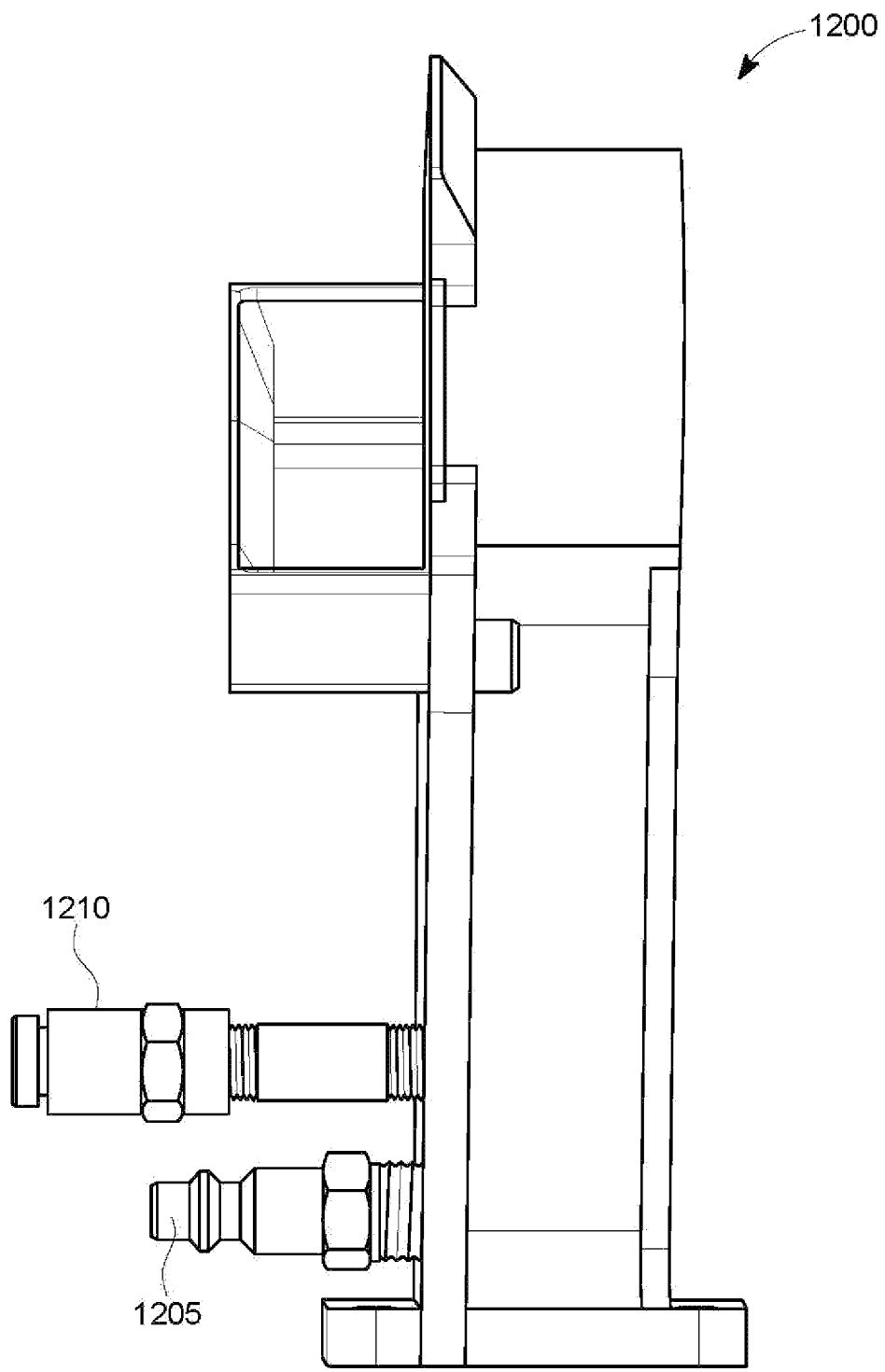
FIG. 13 is a sideview of the tractor gladhand shown in FIG. 12.

FIG. 13 is a sideview of the tractor gladhand 110 shown in FIG. 12.

Figure 14:
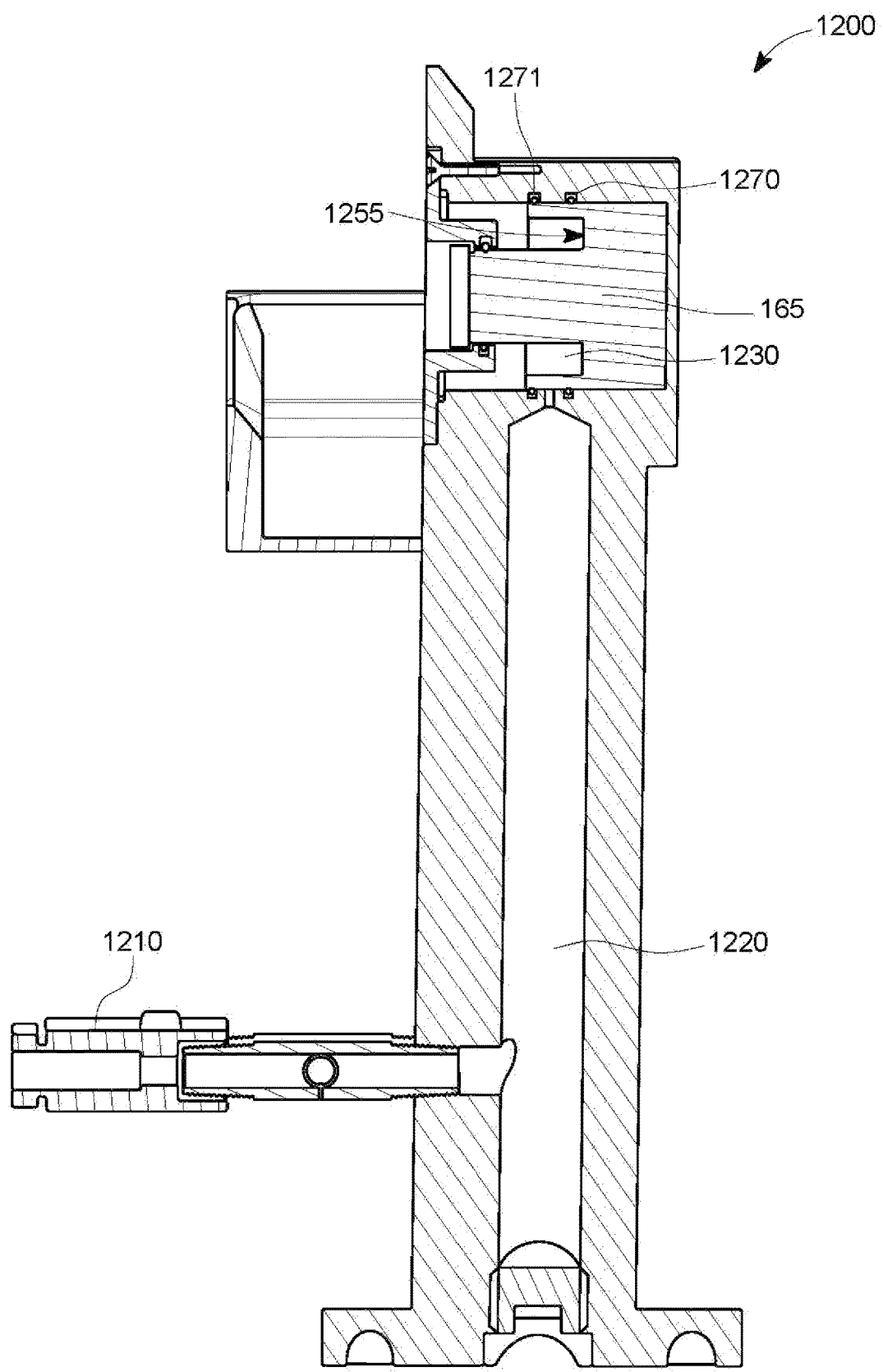
FIG. 14 is a cutaway sideview of the tractor gladhand shown in FIG. 12.

FIG. 14 is a cutaway sideview of the tractor gladhand 110 shown in FIG. 12.

Figure 15:
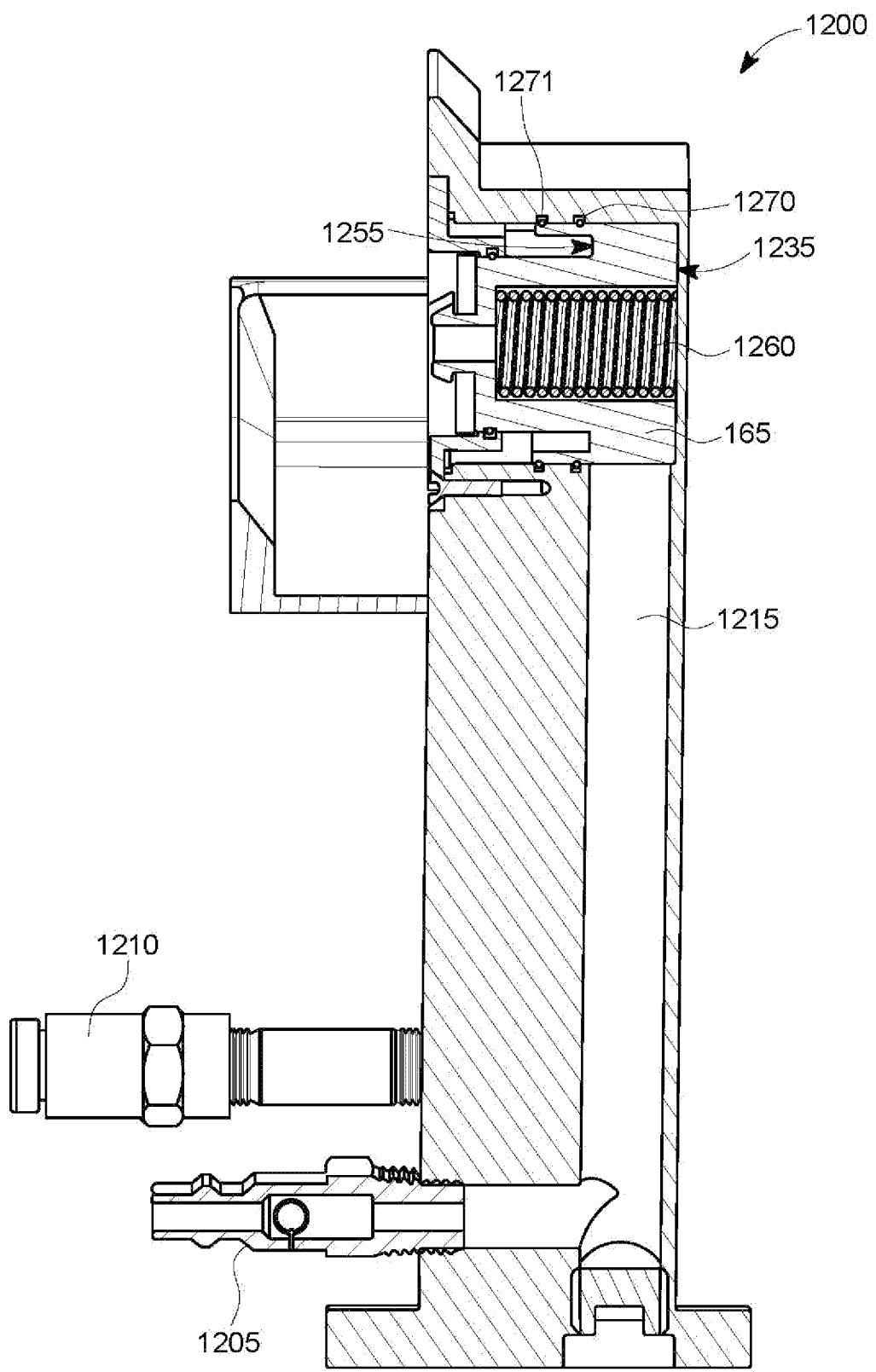
FIG. 15 is a cutaway sideview of the tractor gladhand shown in FIG. 12.

FIG. 15 is a cutaway sideview of the tractor gladhand 110 shown in FIG. 12.

In operation, the tractor gladhand 110 may be slid across the trailer gladhand 105 (either touching or not touching) such that the tractor tongue 160 slides into the trailer pocket 135. Once the tractor tongue 160 is within the trailer pocket 135, the piston 165 may be actuated into the trailer gladhand 105. The piston 165, for example, may be actuated with compressed air or actuated with an electric actuator.

The tractor gladhand 110 may, for example, be coupled with a robotic arm such as, for example, a robotic arm coupled with a tractor. The robotic arm may, for example, be programmed to attach and detach the tractor gladhand 110 with the trailer gladhand 105. The tractor gladhand 110 may be coupled with the trailer gladhand 105 by a human.

Figure 16:
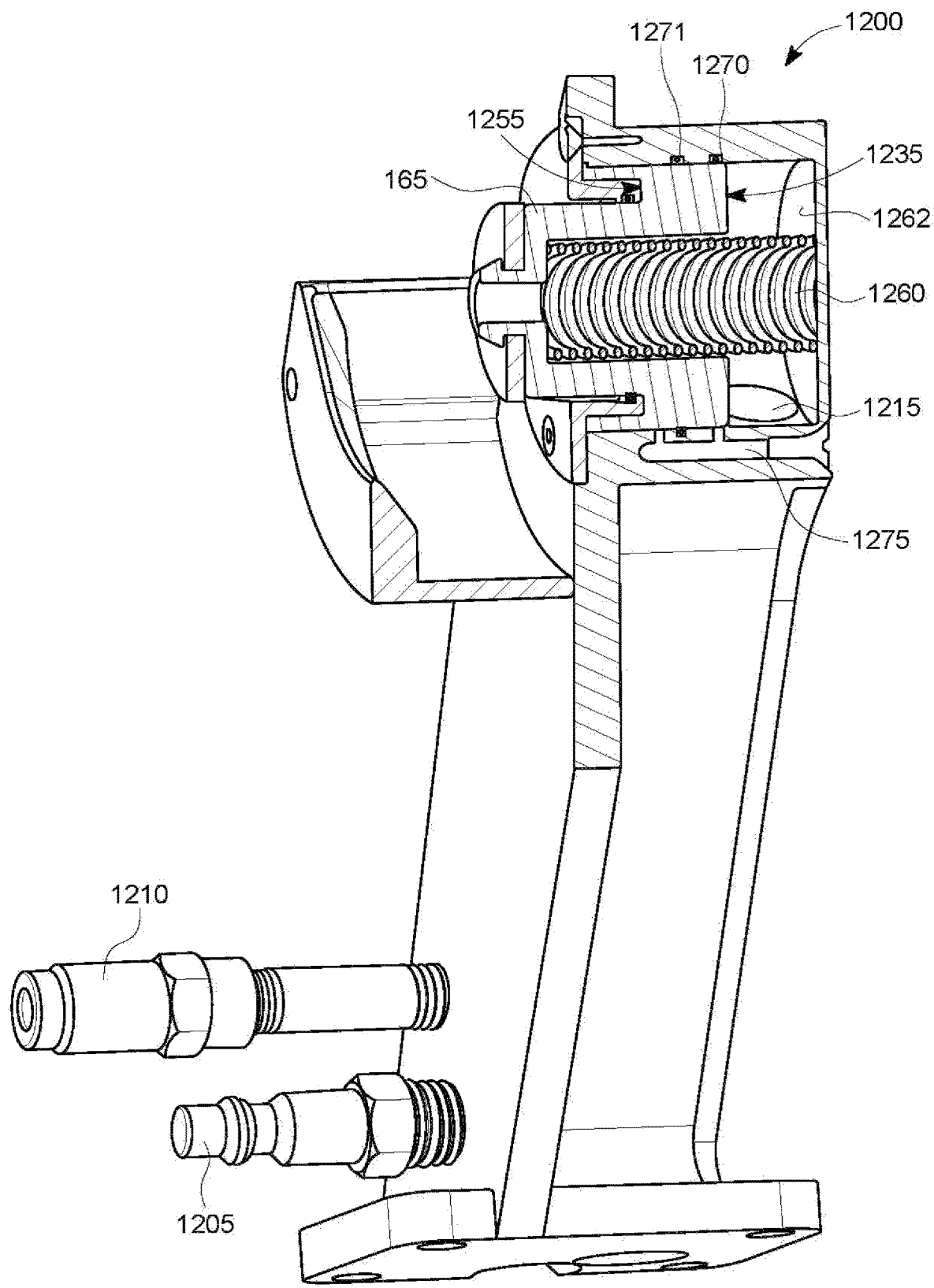
FIG. 16 is a cutaway sideview of the tractor gladhand shown in FIG. 12.

FIG. 12 is a perspective view of a tractor gladhand 1200 with the piston 165 unactuated. FIG. 13 is a sideview of the tractor gladhand 1200 shown in FIG. 12. FIG. 14 is a cutaway sideview of the tractor gladhand 1200 shown in FIG. 12. FIG. 15 is another cutaway sideview of the tractor gladhand 1200 shown in FIG. 12. The tractor gladhand 1200 includes a supply air hose connector 1205 and a control air hose connector 1210. FIG. 16 is a cutaway sideview of the tractor gladhand 1200 shown in FIG. 12 with the piston 165 extended.

The air flowing through air channel 1215 may be delivered to the trailer through tractor gladhand 1200 and then through the trailer gladhand 105.

The supply air hose connector 1205, for example, can be connected to a supply air channel 1215. The supply air channel 1215 can be communicatively coupled with the bottom portion 1262 of the piston cylinder 190 such that pressurized air from the supply air hose connector 1205 can flow through the supply air channel 1215 into the bottom portion 1262 of the piston cylinder 190 and thereby forcing the piston 165 to extend from the piston aperture by creating air pressure against the bottom surface 1235 of the piston 165.

For example, the supply air channel 1215 may also be communicatively coupled with the upper of the piston cylinder 190. This may allow for the pressurized air from the supply air channel 1215 to provide a force on the top surface 1255 of the piston cylinder 190 in the opposite direction as provided by the pressure on the bottom surface 1235 of the piston cylinder 190. The bottom surface 1235, for example, may have a greater surface area than the top surface 1255, which may cause the force provided by the pressurized air on the top surface 1255 to be less than the force provided by the pressurized air on the bottom surface 1235. This may, for example, modulate the force of the pressurized air on the bottom surface 1235.

The control air hose connector 1210, for example, can be connected to a control air channel 1220. The control air channel 1220 can be communicatively coupled with an upper portion of the piston cylinder 190 such that pressurized air from the control air hose connector 1210 can flow though the control air channel 1220 into the upper portion of the piston cylinder 190 and thereby forcing the piston 165 to retract from extending though the piston aperture by creating air pressure against a top surface 1255 of the piston 165. Alternatively or additionally, the control air channel 1220 can be communicatively coupled with the bottom portion 1262 of the piston cylinder 190 such that pressurized air from the control air hose connector 1210 can flow through the control air channel 1220 into the bottom portion 1262 of the piston cylinder 190 and thereby forcing the piston 165 to extend from the piston aperture by creating air pressure against the bottom surface 1235 of the piston 165.

The piston 165 may include a spring 1260 that can be used to bias the piston 165 so that the piston is either extended partially out of the piston cylinder 190 through the piston aperture or retracted into the piston cylinder 190. The spring 1260 may be disposed within the piston 165.

One or more seals 1270, 1271 may be disposed around the piston 165 within the piston cylinder 190. The seals 1270, 1271, for example, may be disposed within a detent that surrounds the piston cylinder 190. The seals 1270, 1271, for example, may allow the piston 165 to move within the piston cylinder 190 without pressurized air escaping from within the piston cylinder 190.

As another example, the one or more seals 1270, 1271 may regulate when or if pressurized air from the control air channel 1220 flows into the bottom portion 1262 of piston cylinder 190 or the top portion of piston cylinder 190. The control air channel 1220, for example, may be coupled with the piston cylinder 190 between the seal 1270 and the seal 1271. Pressurized air from the control air channel 1220 may force the seal 1271 upward within its detent toward the aperture of the piston cylinder 190 and may force the seal 1270 downward within its detent away from the aperture of the piston cylinder 190. This may allow pressurized air from the control air channel 1220 to pressurize the upper portion of the piston cylinder 190 through the air channel 1275.

As another example, when pressurized supply air is introduced into the piston cylinder 190 via the supply air channel 1215 into the lower portion of the piston cylinder 190, the seal 1270 may be forced upward within the detent and allow pressurized air to flow through the air channel 1275 into the upper portion of the piston cylinder 190.

Unless otherwise specified, the term "substantially" means within 5% or 10% of the value referred to or within manufacturing tolerances. Unless otherwise specified, the term "about" means within 5% or 10% of the value referred to or within manufacturing tolerances.

The conjunction "or" is inclusive.

The terms "first", "second", "third", etc. are used to distinguish respective elements and are not used to denote a particular order of those elements unless otherwise specified or order is explicitly described or required.

Numerous specific details are set forth to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

The use of "adapted to" or "configured to" is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A gladhand comprising:
   a gladhand body having a central axis and a substantially flat gladhand surface;
   a tongue that extends from the gladhand body and substantially perpendicular relative to the central axis;
   a concave pocket that extends from gladhand surface;
   a piston chamber within the gladhand body that extends substantially along the central axis and forming a piston aperture within the gladhand surface;
   a piston disposed within the piston chamber that actuates at least partially into and out of the piston chamber through the piston aperture along the central axis; and
   wherein the piston does not include an air channel within the piston.

2. The gladhand according to claim 1, further comprising:
   a seal disposed at least partially within the piston aperture and allows the piston to move into and out of the piston chamber.

3. The gladhand according to claim 1, wherein the gladhand body includes a top surface, and wherein the top surface extends from the gladhand body across at least a portion of the tongue.

4. The gladhand according to claim 1, wherein the concave pocket is sized and configured to accept a tongue from a second gladhand.

5. The gladhand according to claim 1, further comprising an air hose coupling.

6. The gladhand according to claim 5, further comprising an air channel or tube between the air hose coupling and the piston chamber.

7. The gladhand according to claim 5, wherein when air is passing through the air hose coupling a portion of the piston is actuated out of the piston chamber and when air is not passing through the air hose coupling the piston is disposed within the piston chamber.

8. The gladhand according to claim 5, wherein the piston includes an air channel that allows air introduced from the air channel to pass through the air channel within the piston.

9. The gladhand according to claim 1, further comprising an actuator coupled with the piston to move the piston in and out of the piston chamber.

10. The gladhand according to claim 1, wherein the piston includes an air channel within the piston.

11. A gladhand comprising:
    a gladhand body having a central axis and a substantially flat gladhand surface;
    a tongue that extends from the gladhand body and substantially perpendicular relative to the central axis;
    a piston chamber within the gladhand body that extends substantially along the central axis and forming a piston aperture within the gladhand surface;
    a piston disposed within the piston chamber that actuates at least partially into and out of the piston chamber through the piston aperture along the central axis;
    a supply air hose coupling coupled with the gladhand body;
    a supply air channel disposed within the gladhand body that allows air to flow from the supply air channel to the piston chamber to actuate the piston in a first direction within the piston chamber; and
    a control air hose coupling coupled with the gladhand body; and
    a control air channel disposed within the gladhand body that allows air to flow from the control air channel to the piston chamber to actuate the piston in second direction within the piston chamber, the second direction being opposite the first direction.

12. The gladhand according to claim 11, further comprising a spring disposed within the piston that biases the piston relative to the gladhand body.

13. The gladhand according to claim 11, further comprising one or more seals disposed around the piston within the piston chamber.

14. The gladhand according to claim 11, further comprising a concave pocket that extends from gladhand surface.

15. The gladhand according to claim 14, wherein the gladhand body includes a top surface, and wherein the top surface extends from the gladhand body across at least a portion of the tongue.

16. The gladhand according to claim 14, wherein the concave pocket is sized and configured to accept a tongue from a second gladhand.

17. The gladhand according to claim 11, further comprising a concave pocket that extends from gladhand surface.

18. A gladhand comprising:
    a gladhand body having a central axis and a substantially flat gladhand surface;
    a tongue that extends from the gladhand body and substantially perpendicular relative to the central axis;

a piston chamber within the gladhand body that extends substantially along the central axis and forming a piston aperture within the gladhand surface;

a piston disposed within the piston chamber that actuates at least partially into and out of the piston chamber through the piston aperture along the central axis;

a supply air hose coupling coupled with the gladhand body;

a supply air channel disposed within the gladhand body that allows air to flow from the supply air channel to the piston chamber to actuate the piston in a first direction within the piston chamber;

a control air hose coupling coupled with the gladhand body;

a control air channel disposed within the gladhand body that allows air to flow from the control air channel to the piston chamber to actuate the piston in second direction within the piston chamber, the second direction being opposite the first direction; and a spring disposed within the piston that biases the piston relative to the gladhand body.

\* \* \* \* \*